United States Patent [19]

Richard

[11] Patent Number: 5,118,156
[45] Date of Patent: Jun. 2, 1992

[54] AUXILIARY LOAD CARRIER FOR CARGO BOX

[76] Inventor: Regis J. Richard, P.O. Box 1297, Pepperell, Mass. 01463

[21] Appl. No.: 655,788

[22] Filed: Feb. 14, 1991

[51] Int. Cl.$^5$ ............................................. B60R 9/08
[52] U.S. Cl. ........................... 296/40; 296/37.6; 296/183; 248/231.4; 224/331; 410/143; 410/152
[58] Field of Search ............... 414/498; 182/150, 206; 410/152, 143, 156; 296/39.2, 40, 43, 37.6, 183; 248/231.4, 316.4; 24/486, 524; 224/314, 322, 325, 329, 331

[56] References Cited

U.S. PATENT DOCUMENTS

| | | | |
|---|---|---|---|
| 2,291,870 | 8/1942 | Blair et al. | 248/231.4 |
| 2,649,054 | 8/1953 | Rueckert | 410/156 X |
| 2,697,631 | 12/1954 | Miller | 296/376 X |
| 3,240,455 | 3/1966 | Swezy et al. | 248/231.4 X |
| 3,336,642 | 8/1967 | Armacost | 24/524 X |
| 3,865,431 | 2/1975 | Zakhi | 182/150 X |
| 4,215,898 | 8/1980 | Ulics | 296/183 |
| 4,343,578 | 8/1982 | Barnes | 410/143 X |
| 4,394,100 | 7/1983 | Sperlich | 296/183 X |
| 4,527,827 | 7/1985 | Maniscalo et al. | 224/324 X |
| 4,751,981 | 6/1988 | Mitchell et al. | 182/127 |
| 4,767,149 | 8/1988 | Rye | 296/39.2 |
| 4,796,942 | 1/1989 | Robinson et al. | 296/39.2 |
| 4,850,633 | 7/1989 | Emery | 296/39.2 |

FOREIGN PATENT DOCUMENTS 200939  12/1958  Fed. Rep. of Germany ...... 224/331

Primary Examiner—Robert J. Spar
Assistant Examiner—Robert S. Katz
Attorney, Agent, or Firm—Pearson & Pearson

[57] ABSTRACT

A load support system for carrying a load in a support plane at or above the wheel wells in the cargo box of a pickup truck. Clamping structures releasably clamp to flanges at the top of the cargo box. Depending bodies from the clamping structures carry load support beams that span substantially the width of the cargo box between the flanges. The load support beams define the load support plane that allows items to be carried in the load support plane that would not fit between the wheel wells on the floor of the cargo box.

20 Claims, 3 Drawing Sheets

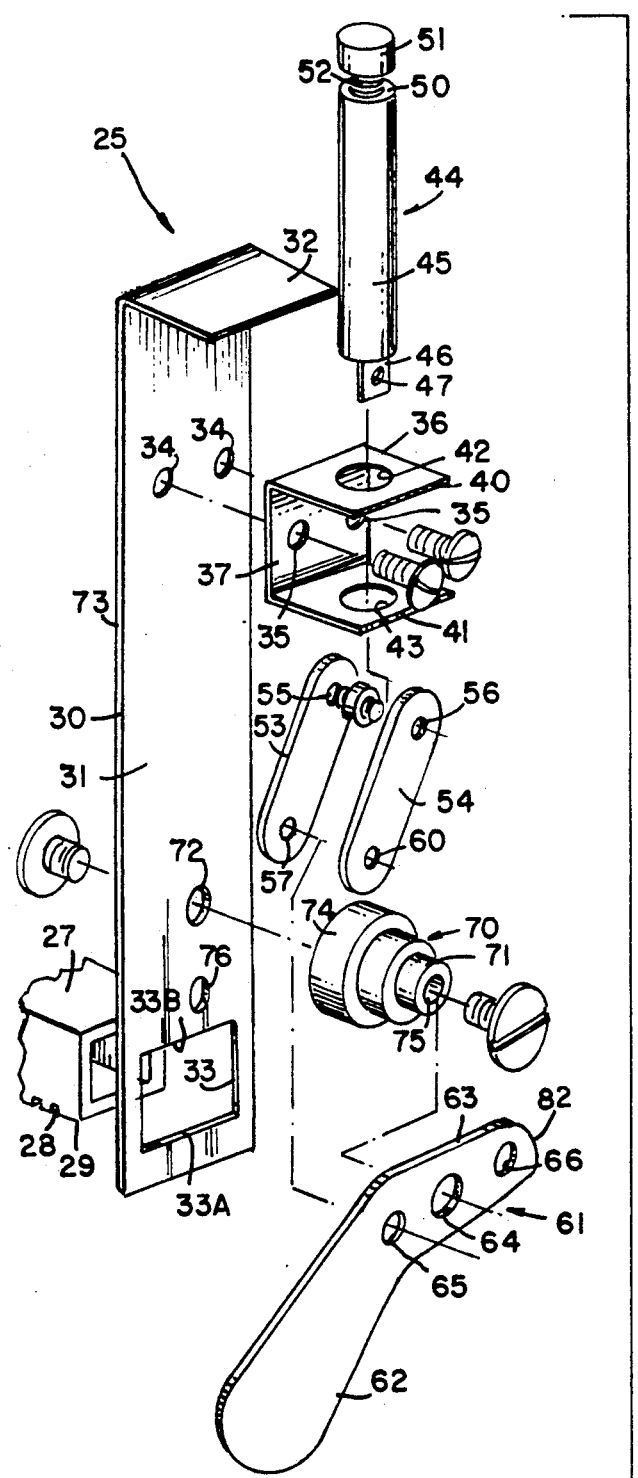
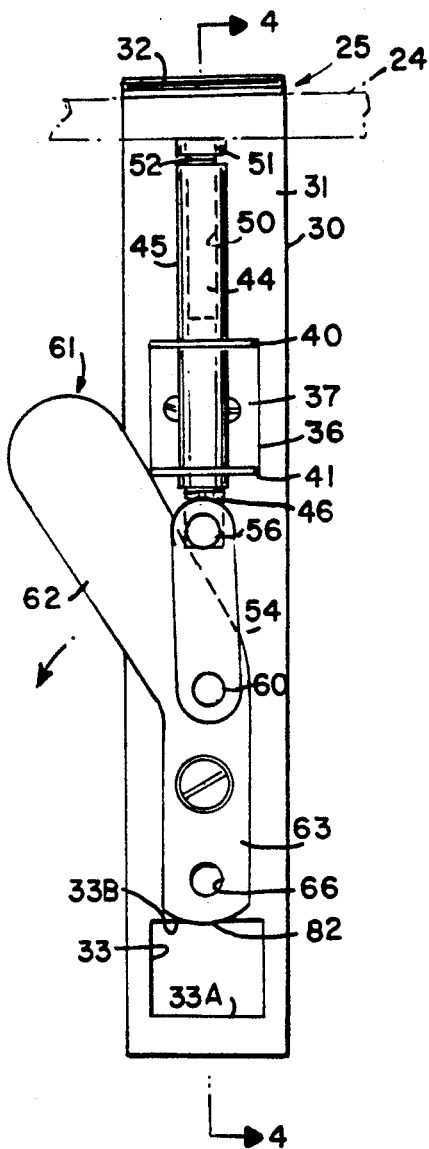
FIG. 3
FIG. 6

AUXILIARY LOAD CARRIER FOR CARGO BOX

BACKGROUND OF THE INVENTION

1. Field of the Invention

This invention generally relates to apparatus for supporting loads and more particularly to apparatus for supporting loads in a cargo box, such as found in pickup trucks with wheel wells protruding into the cargo box.

2. Description of Related Art

In recent years pickup trucks have replaced full-size trucks for the transportation of goods and materials, especially those used in construction. Pickup trucks are less expensive to purchase and operate and have a smaller overall profile than full-size trucks. A reduction in width has been made possible by moving the wheels inwardly toward the center line of the truck and fashioning wheel wells within a cargo box to cover the wheels.

Although the top of such a cargo box may have an opening in excess of four feet, the standard width of many construction materials such as plywood and wallboard, the clearance on the floor between the wheel wells is less. It is not possible to store construction panels horizontally on the floor. Vertical storage is not always acceptable because the edges of the panels can be damaged and the center of gravity of the load can rise two feet above the floor making the load less stable during transportation. Moreover, special structures must stabilize the load, and it is difficult to cover vertical panels to protect them from weather and vandalism.

The inability to carry panels on the floor of a cargo box in pickup trucks has led to structures for adapting the cargo boxes for storing panels and other oversized items. Suggestions for adapting cargo boxes of pickup trucks with internal wheel wells for receiving such items are disclosed in the following patents:

U.S. Pat. No. 2,697,631 (1954) Miller
U.S. Pat. No. 4,215,898 (1980) Ulics
U.S. Pat. No. 4,394,100 (1983) Sperlich
U.S. Pat. No. 4,527,827 (1985) Maniscalco et al
U.S. Pat. No. 4,751,981 (1988) Mitchell et al The Miller patent discloses a structure for engaging a flange on a cargo bay and a depending channel. Opposed channels receive vertically stacked boards to form a partition that separates the cargo bay into separate components. In one embodiment a curved upper edge portion of a support structure engages outwardly rolled marginal portions or flanges of a cargo bay side wall. A vertically extending channel lies inside a cargo bay against a side wall and receives the transversely extending boards to provide the transverse vertical partition. As the boards are placed in the opposed channels, they force the channels outwardly into clamping engagement with side walls.

The Ulics patent discloses a modification to a conventional pickup truck with internal wheel wells. Preformed recesses, produced during manufacture or by structural modification to the vehicle and located in side walls, support transverse beams. The beams define a support surface or load support plane for such construction panels and the like. The plane lies at or above the upper plane of the wheel wells.

Sperlich discloses a structure for supporting a horizontal panel as a cover that includes a channel across the front wall of a cargo box and another channel in a tailgate. The channels lie in a plane corresponding to a plane through horizontal treads at the top of internal wheel wells. The channels support the ends of a covering panel. The treads support the panel at an intermediate position along the panel side. Affixing channels to the front end of the cargo bay and to the tailgate constitutes a structural modification. Moreover, a panel supported only at the ends and at the treads is not adapted for supporting heavy loads.

Maniscalco et disclose a support structure that clamps to the flanges of a cargo box for supporting a load element that is larger than the cargo box and defines a horizontal support surface that lies above the cargo box. Particularly Maniscalco discloses a vertical rack for windsurfing boards with a horizontal support that is elevated above the cargo box by inclined legs that clamp to flanges at the cargo box and the horizontal support member. The height of the support surface makes it difficult to load and unload heavy items, such as construction panels, from the support.

Mitchell et al disclose a ladder rack that is removable from the cargo box. The ladder rack has a support structure bolted to the sides of the cargo box and a ladder support structure with vertically disposed stanchions that engage the brackets. Mitchell et al require structural modifications to the vehicle.

SUMMARY

Therefore it is an object of this invention to provide a means for defining a load support plane for construction panels and the like displaced above the floor portion of a cargo box.

Another object of this invention is to provide a load support system and components therefor that adapts a cargo box for supporting items on a load plane that is spaced from the floor.

Yet another object of this invention is to provide a load support system and components therefor that adapt a cargo box to carry large items above obstructions in the cargo box without any permanent structural modifications.

Still another object of this invention is to provide a load support system and components therefor adapted for defining a full-width lead support surface in a pickup truck cargo box that lies above internal wheel wells.

In accordance with this invention, plural clamping support means clamp to flanges along the tops of side walls of a cargo box. Each clamping support means has an elongate body means that is disposed vertically inside the cargo box proximate the side wall. The clamping support means has, at one end, a flange engaging means for engaging the flange of the cargo box and at the other end, means for supporting one end of a transverse beam. Clamping means attached to the body means intermediate the ends thereof releasably clamp to the cargo box flange. Thus, the clamping support means securely support the ends of a transverse beam parallel to the floor and spaced therefrom by a given distance. Two or more beams then define a load support plane for carrying wide items above the wheel wells.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

FIG. 3 is an exploded perspective view of components of this invention;

FIG. 6 is a plan view of a clamping support means in a clamped position.

DESCRIPTION OF AN ILLUSTRATIVE EMBODIMENT

Figure 1:
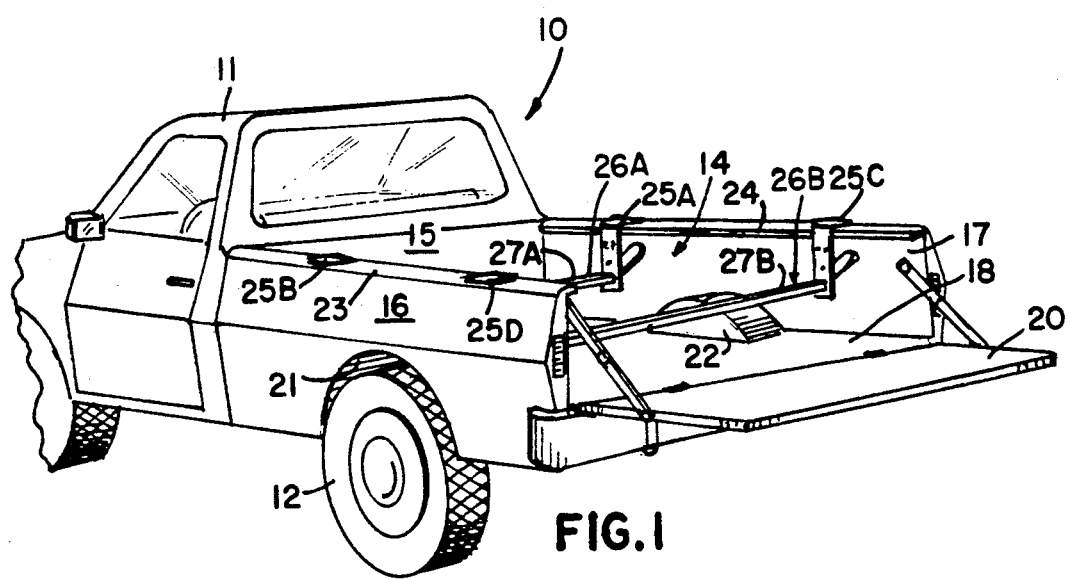
FIG. 1 is a perspective view of a pickup truck with a load support system constructed in accordance with this invention attached thereto.
Figure 2:
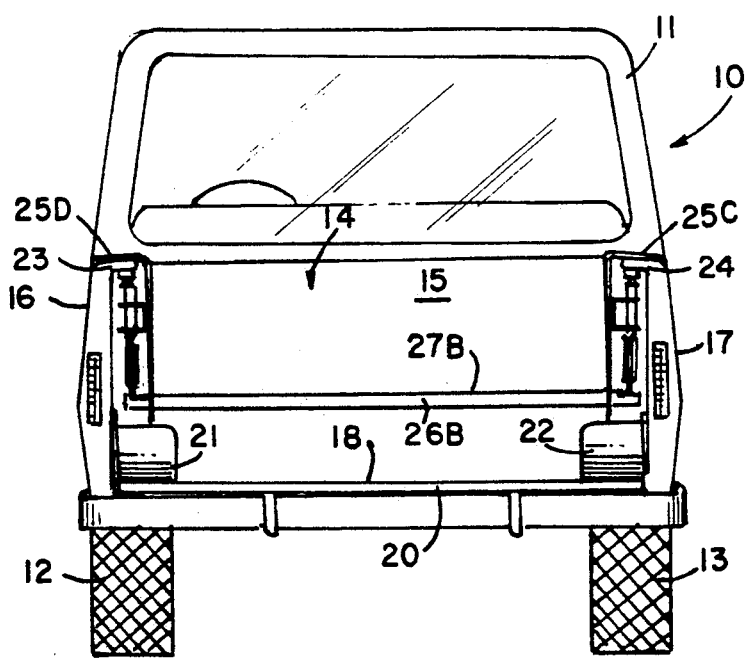
FIG. 2 is a view of the pickup truck in FIG. 1 from the rear.

Referring to FIGS. 1 and 2, a conventional pickup truck 10 has a cab 11 and rear tires 12 and 13 that mount to a chassis. The chassis supports a cargo box 14 with a front wall 15, side walls 16 and 17, a floor 18 and a tailgate 20. As previously indicated, the overall width of the truck is reduced by moving wheels 12 and 13 into internal wheel wells 21 and 22 that encroach into the cargo box 14 by extending upwardly from the floor 18 adjacent the side walls 16 and 17 respectively by a given distance Although the distance between the side walls 16 and 17 in many pickup trucks can accommodate a four-foot wide panel in a horizontal position, the distance between the wheel wells 21 and 22 at the floor 18 is reduced, so the wheel wells 21 and 22 prevent such wide panels from reaching the floor 18 in a horizontal plane.

A number of pickup trucks such as shown in FIGS. 1 and 2 terminate their side walls 16 and 17 with upper inturned flanges 23 and 24. In accordance with one aspect of this invention, the flanges 23 and 24 carry clamping supports 25A, 25B, 25C and 25D. These supports hang from the flanges 23 and 24. Oppositely disposed ones of the clamping supports carry a load support beam. As shown in FIGS. 1 and 2, the clamping supports 25A and 25B carry a load support beam 26A; the clamping supports 25C and 25D, a load support beam 26B. The beams 26A and 26B are parallel to the floor 18. Upper surfaces 27A and 27B lie in a load support plane that is spaced from the floor 18 by a given distance that locates the load support plane at or above the tops of the wheel wells 21 and 22. This permits the load support plane to overlie the wheel wells. Further, each of the clamping supports 25A through 25D engages one of the flanges 23 and 24 without significantly extending into the cargo box 14 beyond the flanges 23 and 24. As typical pickup trucks have an opening between the flanges 23 and 24 of about 50 inches or more, the load support beams 26A and 26B can define a load support plane for accommodating four-foot wide construction panels.

Each clamping support constructed in accordance with this invention merely clamps to a flange. Thus, there is no requirement for any structural modifications to the pickup truck. Moreover, it is an easy task to install and remove the clamping supports as necessary.

Figure 4:
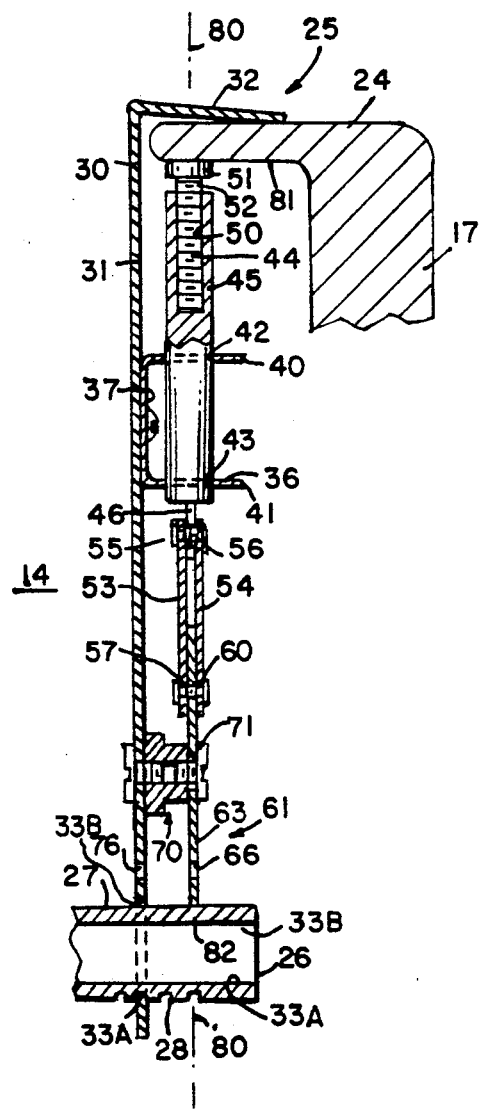
FIG. 4 is a cross-sectional view taken generally along lines 4—4 in FIG. 6 illustrating a connection of the clamping support means and a transverse bar to the flange of a cargo box.

The basic components of a load support system constructed in accordance with this invention are shown in FIGS. 3 and 4 that depict a portion of a transverse beam 26 and the various elements of a clamping support 25. More specifically, the clamping support 25 comprises a main body section 30 that has a planar plate portion 31 for vertical disposition inside the cargo box proximate to a side wall 17 or the other side wall and a flange engaging lip 32. The lip 32 is an extension of the plate portion 31 bent to an angle that is less than 90° to the plate portion, about 85. being a preferable angle for reasons described in more detail later.

The body 31 has, at an end opposite the lip 32, a square aperture 33 that receives one end of the transverse beam 26. The distance between a bottom surface of the lip 32 and a bottom edge 33A of the aperture 33 determines the position of the top surface 27 of the transverse beam 26 and the load support plane relative to the floor 18. The lip 33A rests in one of a plurality of spaced transverse grooves 28 formed in the bottom surface 29 of the transverse beam 26. Typically the load support plane that the upper surfaces 27 define is parallel to and spaced above the floor by a distance greater than the given distance from the floor to the tops of the wheel wells. It has been found the range of the given distances for pickup trucks of different manufacturers and the range of the depths of the cargo boxes measured from the flanges to the floor are relatively small. This allows selection of a nominal, or single, dimension from the lip 32 to the bottom edge 33A of the aperture 33 to locate the transverse beams 26 properly in a wide variety of vehicles.

A set of locating apertures 34 in the planar plate 31 that align with apertures 35 in a rod guide 36 so the rod guide 36 can be bolted to the planar plate 31. As will be apparent, however, welding or other means could be utilized to attach the rod guide 36 to the plate 31. The rod guide 36 is a U-shaped channel with a base portion 37 that contacts the planar plate 31 and two spaced parallel legs 40 and 41 that extend at substantially right angles to the base portion 37. A rod guide aperture 42 in the leg 40 and an aperture 43 in the leg 41 provide a means for receiving and supporting a rod assembly 44 for reciprocal motion with respect to the rod guide 36 and the planar plate 31.

The rod assembly 44 has a cylindrical body portion 45 with a tongue 46 extending from a bottom end thereof that has an aperture 47. A tapped axially extending hole 50 at the top of rod assembly 44 receives an adjustment structure comprising a head 51 and a threaded portion 52 that permits adjustment of the overall length of the rod assembly 44. Although shown as comprising a cylindrical rod, the rod assembly 44 could have any other configuration with an appropriate modification to the form of the apertures 42 and 43.

When the rod assembly 44 is installed in the rod guide 36, the tongue 46 connects to a pair of links 53 and 54 that form linkage means having spaced pivotal connection means. More specifically, a fastening device such as a peaned pin pivotally connects each of links 53 and 54 to the rod assembly 44 by passing through apertures 55 and 56 in the links 53 and 54 and the aperture 47 to the tongue 46. This forms one pivotal connection means.

A similar fastening device passes through apertures 57 and 60 in the links 53 and 54, respectively, and pivotally connects them to an operating handle 61. This constitutes another pivotal connection means spaced from the other pivotal connection means. The operating handle 61 has a first arm 62 and a second arm 63 that is angled approximately 45° with respect to the first arm 62, although the exact angle is not important. The arm 63 has a central aperture 64. An aperture 65 and a locking aperture 66 are offset on either side of the central aperture 64. The links 53 and 54 straddle the arm 63.

The operating handle 61 rotates about a pivot 70 affixed to the plate 31. More specifically, the central aperture 64 rides on a shoulder 71 of the pivot 70. A machine screw can pass through an aperture 72 from a back surface 73 of the plate into an internally threaded tapped hole (not shown) in the pivot 70. As the shoulder 71 is spaced from the plate 31, the pivot 70 spaces the operating handle 64 from the plate 31 and aligns it under the tongue 46. A similar fastening device engages a tapped hole 75 in the shoulder 71 to capture the operating handle 61 on the shoulder 71 and to permit the handle 61 to rotate about the pivot 70 and with respect to the body 30.

The locking aperture 66 can align with another locking aperture 76 in the planar plate 31 that is intermediate the apertures 33 and 72. When the operating handle 61 moves the rod assembly 44 to a clamped position, the locking apertures 66 and 76 align. A cable or hasp then can pass through the apertures 66 and 76 to lock the operating handle 61 in a clamping position to prevent removal of the clamping support 25 from a vehicle.

Figure 5:
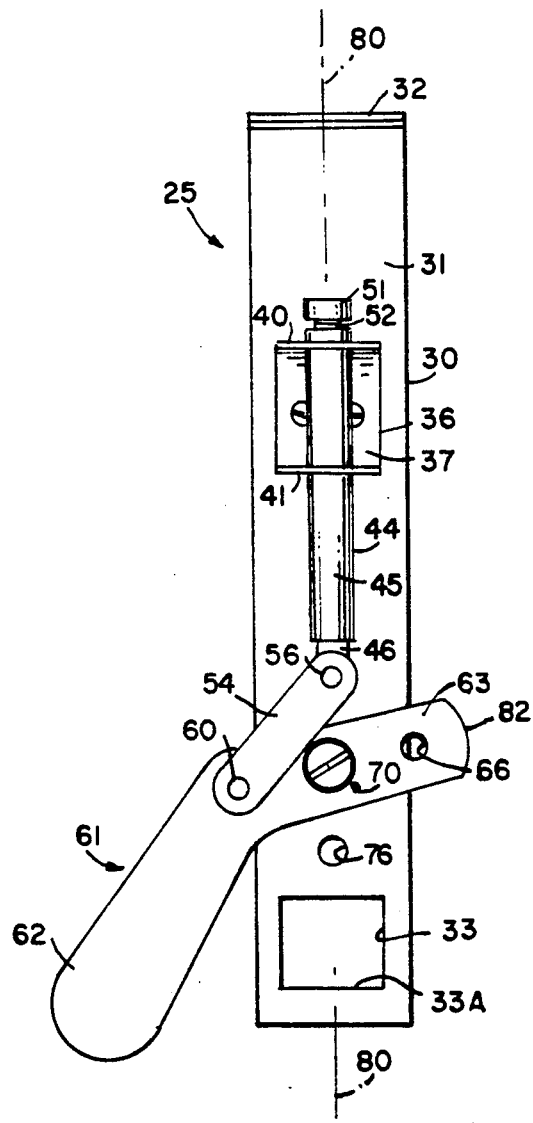
FIG. 5 is a plan view of a clamping support means in an unclamped condition.

FIG. 5 discloses a clamping structure 25 in an unclamped or uninstalled condition. The handle 61 is in a lower position having been rotated counterclockwise to the position shown in FIG. 5. The handle 61 can rotate still further counterclockwise until the arm 63 abuts the tongue 46. In these positions the aperture 60, that represents a pivot between the arm 63 and the link 54, lies to one side of an axis 80 through the center of the rod assembly 44 and aligned with the pivot 70 (i.e., to the left of the axis as shown in FIG. 5).

To install a load support system in accordance with this invention, a pair of clamping structures 25 and a load support beam 26, as shown in FIG. 4, are positioned with their respective lips 32 on top of each of the flanges, such as the flanges 23 and 24, flange 24 being shown in FIG. 4. One end of the transverse beam 26 extends through the aperture 33 so and edge 33A engages one of the grooves 28 and captures the transverse beam 26. Once positioned, an individual raises the arm 62 of the operating handle 61. This action initially elevates the pivot point represented by the aperture 60 and drives the rod assembly 44 vertically along the axis 80 toward the lip 32. The rod guide 36 constrains the rod assembly 44 to axial motion, and the link 54 pivotally connects to the tongue 46. Assuming the head 51 is adjusted to provide an appropriate overall length of the rod assembly 44, the head 51 contacts a lower surface 81 of the flange 24 as the arm 62 approaches a corner of the lower leg 41 of the rod guide 36.

During a final incremental motion of the operating handle 61, the pivot represented by the aperture 60 passes to the other side of axis 80 (to the right as shown in FIG. 6). This produces an incremental component of axial motion of the aperture 60 toward the pivot 70. Thus, the lindage must actually produce additional clamping force before it can release. The linkage comprising the operating handle 61, links 53 and 54 and rod assembly 44 thus is an over-center linkage. The interference between the arm 62 and the leg 41 limits the over-center travel of the pivot represented by aperture 56.

During this clamping operation the slight over-bend of the lip 32 with respect to the perpendicular plate 31 provides some flexibility in the position of the lip 32. This flexibility overcomes minor differences in the length of the rod assembly 44 as determined by the position of the head 51. The over-bend also provides a more secure clamping action that is less susceptible to release through vibrations, particularly when the clamping structure 25 is used with a pickup truck.

As shown in FIGS. 3, 4 and 6, an end portion 82 of the arm 63 overlies the aperture 33 at a top edge 33B. As previously stated the edge 33A engages on of the transverse grooves 28 in the bottom surface 29 of the transverse load beam 26. Thus, as shown in FIG. 4 the end portion 82 cams against the upper wall 27 to lock the transverse beam 26 to the clamping structure 25. This prevents any motion of the load support beam 26 with respect to the plate 31. As previously described, locking apertures 66 and 76 align in this position to allow the operating handle 61 and plate 31 to be locked together and prevent any unauthorized removal of the clamping structure from the pickup truck.

Summarizing and referring to FIGS. 1, 2, 4 and 6, a clamping support structure 25 constructed in accordance with this invention supports a transverse load support beam 26 with an upper surface 27 that defines a load support plane. In the cargo box of a pickup truck or other structure the clamping structure 25 supports the transverse beam 26 with the upper surface 27 in a plane at or above the wheel wells or other obstruction that may penetrate the floor of the cargo box. The clamping structure only incrementally encroaches into the space between flanges 23 and 24, so the load support system is essentially coextensive with the area between the flanges. As previously indicated even smaller panel trucks with internal wheel wells space the flanges 23 and 24 by an amount greater than four feet, so the load support system of this invention enables such a pickup truck to carry standard four-foot wide construction panels and the like in a horizontal orientation. Further, the load support system of this invention requires a minimum volume within the cargo box. The area under the load support beams 26 is still available for storing smaller items. Thus, the transverse beam 26 can support either multiple panels or a simple cover while providing storage below the plane.

This invention has been defined in terms of a preferred embodiment and utilizes specific structures for purposes of understanding the invention. A number of alternatives are available. For example, the specification discloses the approach of bolting various components together to form the clamping structure. Welding and other appropriate techniques can also be utilized. The specification discloses specific structures of providing various clamping functions and for defining a load support plane. It will be apparent to those of ordinary skill in the art that alternative structures can be used to achieve the same function with the attainment of all or some of the advantages of this invention. Therefore, it is the intent of the appended claims to cover any and all such variations and modifications as come within the true spirit and scope of this invention.

What is claimed as new and desired to be secured by Letters Patent of the United States is:

1. A clamping support means for supporting one end of a transverse beam at a given distance above and parallel to a floor in a cargo box defined by the floor and spaced parallel side walls with flange means positioned along the top of the side walls, said clamping support means comprising:

A. elongate body means for vertical disposition in the cargo box adjacent a side wall having at one end thereof first flange engagement means for engaging a portion of the flange of the cargo box and having at the other end thereof transverse beam support means for supporting the transverse beam at the given distance above the floor when said first flange engagement means contacts the flange, and B. clamping means connected to said body means intermediate the ends thereof for releasably clamping the cargo box flange means between said first flange engagement means and said clamping means, said clamping means including:

i. second flange engagement means mounted on said elongated body means for reciprocal movement with respect to said first flange engagement means and ii. driving means for driving said second flange engagement means toward the first flange engagement means, said driving means including operating handle means for operating said clamping means, pivot means connected to said elongate body means for supporting said handle for pivotal motion, and linkage means having spaced pivotal connection means for connection to each of said operating handle means and said second flange engagement means for converting pivotal motion of said operating handle means into reciprocal motion of said second flange engagement means.

2. A clamping support means as recited in claim 1 wherein said body means comprises elongate planar plate means with said first flange, engagement means being formed integrally therewith at less than 90° to the plane of said planar plate means.

3. A clamping support means as recited in claim 2 wherein said first flange engagement means is formed at about 85° to the plane of said planar plate means.

4. A clamping support emans as recite din claim 1 wherein s aid second flange engagement means reciprocates along an axis aligned with said pivot means and wherein said linkage means connects pivotally to said second flange engagement means and to said operating handle means at a linkage connection site displaced from said pivot means, said linkage connection site moving from one side to the other side of the axis when said second flange engagement means clamps the flange, said body means including support means for guiding said second flange engagement means and for interfering with said operating handle means to limit the displacement of said linkage connection site to the other side of the axis whereby said linkage means provides over-center locking.

5. A clamping support means as recited in claim 4 wherein each of said operating handle means and said body means has a locking aperture, said locking apertures aligning when said operating handle means and said support means interfere to enable said operating handle means and body means to be locked together thereby to prevent further motion of said operating handle means.

6. A clamping support means as recited in claim 1 wherein said second flange engagement means includes means for varying the length thereof.

7. In a pickup truck having a cargo box defined by a floor, and spaced parallel side walls and having wheel wells projecting upwardly from the floor a given distance along each side wall, each side wall having flange means positioned along the top thereof, the improvement of a load support system for defining a load support plane that is parallel to and spaced, by at least the given distance, from the floor, said load support system comprising:

A. a plurality of spaced, parallel, elongated load support beams extending between the side walls and defining the load support plane, and B. a clamping support means for supporting each end of each of said load support beams including:

i. elongate body means for vertical disposition in the cargo box adjacent a side wall having first flange engagement means at the other end for engaging a portion of the flange at a side wall and having means at the other end thereof for supporting an end of a said load support beam at the given distance above the floor when said first flange engagement means contacts flange, and ii. clamping means connected to said body means intermediate the ends thereof for releasably clamping the flange at a side wall between said clamping means and said first flange, engagement means whereby each said body means hangs said transverse beam from a cargo box side wall flange.

8. A load support system as recited in claim 7 wherein, in each said clamping support means, said body means comprises elongate planar means with said first flange engagement means being formed integrally therewith at less that 90° to the plane of said planar plate means.

9. A load support system as recited in claim 8 wherein said first flange engagement means is formed at about 85° to the plane of said planar plate means.

10. A load support system as recited in claim 7 wherein, in each said clamping support means, said clamping means comprises:

a. second flange engagement means mounted on said elongate body means for reciprocal movement with respect to said first flange engagement means and, b. driving means for driving said second flange engagement means toward said first flange engagement means.

11. A load support system as recited in claim 10 wherein said driving means includes operating handle means for operating said clamping means, pivot means connected to said elongate body means for supporting said operating handle means for pivotal motion, and linkage means for interconnecting said operating handle means and said second flange engagement means thereby converting pivotal motion of said operating handle means into reciprocal motion of said second flange engagement means.

12. A clamping support means as recited in claim 11 wherein said second flange engagement means reciprocates along an axis aligned with said pivot means and wherein said linkage means connects pivotally to said second flange engagement means and to said operating handle means at a linkage connection site displaced from said pivot means, said linkage connection site moving from one side to the other side of the axis when said second flange engagement means clamps the flange, said body means including support means for guiding said second flange engagement means and for interfering with said operating handle means to limit the displacement of said linkage connection site to the other side of the axis whereby said linkage means provides over-center locking.

13. A load support system as recited in claim 12 wherein each of said operating handle means and said body means has a locking aperture, said locking apertures aligning when said operating handle means and said support means interfere to enable said operating handle means and said body means to be locked together to prevent operation of said operating handle means.

14. A load support system as recited in claim 11 wherein said second flange engagement means include means for varying the length thereof.

15. A load support system as recited in claim 11 wherein each said transverse beam comprises a rectangular hollow structure with one wall lying in the load support plane, and an opposite wall having a plurality of transverse grooves formed at the ends thereof for being engaged by each of said transverse beam support means, said operating handle means having a portion for camming said one wall of said transverse beam thereby to lock said transverse beam to said clamping support means.

16. A load support system for defining a load support plane parallel to and above a floor in a cargo box in a pickup truck having side walls with inturned flanges along the tops thereof, said load support system comprising:

A. at least two spaced load support beams perpendicular to the side walls for defining the load support plane, and B. a clamping support at each end of each said load support beams affixed to the side wall flanges for supporting said load support beams at the load support plane, each said clamping support including:
 i. an elongate body portion with an aperture at one end for receiving an end of a said load support beam and a lip at the other end for overlying a side wall flange, the distance between said lip and said aperture determining the position of said load support plane relative to the flange and the floor of the cargo box,
 ii. rod means having a first end portion for clamping the flange to said lip and having a second end portion,
 iii. a rod guide affixed to said body portion intermediate said lip and said aperture for supporting said rod means intermediate said first and second end portions thereof for motion along an axis that intersects said lip,
 iv. linkage means having first and second end portions, said first end portion being pivotally connected to said rod means,
 v. operating handle means for driving said rod means along the axis, said operating handle means having a first arm for being operated to clamp and release said support to the flange and a second angularly displaced arm with means for engaging pivotally said second end portion of said linkage means, and
 vi. pivot means connection to said elongate body portion intermediate said rod guide means and said aperture for engaging said second arm of said operating handle means for enabling said operating handle means to pivot with respect to said elongate body portion in a plane parallel thereto, rotation of said first arm of said operating handle means producing motion of said rod means along the axis.

17. A load support system as recited in claim 16 wherein, in each said clamping support, said operating handle means pivots one end of said linkage means from one side to the other side of the axis as said operating handle means moves said rod means into a clamped position thereby to provide an over-center locking of said linkage means, said operating handle means interfering with said rod guide thereby to limit the displacement of said connection between said linkage means and said operating handle means to the other side of said axis.

18. A load support system as recited in claim 16 wherein, in each said clamping support, each of said operating handle means and said body portion having a locking aperture, said locking apertures aligning when said operating handle means clamps the flange on the pickup truck between said lip and said rod means thereby to enable said operating handle means and said body portion to be locked together to prevent operation of said operating handle means.

19. A load support system as recited in claim 16 wherein said rod means comprises a cylindrical body portion with a tapped hole at said first end portion, a tongue at the second end portion thereof for engagement by said linkage means, and adjustment means having a head portion for engaging the flange and a threaded portion for engaging said tapped hole thereby to position said head portion with respect to said body portion.

20. A load support system as recited in claim 16 wherein each said transverse beam comprises a rectangular hollow structure one wall having a plurality of grooves formed at the ends thereof, said operating handle means on each said clamping support having a portion for engaging said transverse bar at one of its grooves thereby to lock said transverse bar to said clamping support.

* * * * *